(12) United States Patent
Lee et al.

(10) Patent No.: US 9,680,853 B2
(45) Date of Patent: Jun. 13, 2017

(54) APPARATUS AND METHOD FOR PREVENTING MALICIOUS CODE IN ELECTRONIC DEVICE

(71) Applicant: Samsung Electronics Co., Ltd, Gyeonggi-do (KR)

(72) Inventors: Jewon Lee, Gyeonggi-do (KR); Youngkyoo Kim, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 3 days.

(21) Appl. No.: 14/752,223

(22) Filed: Jun. 26, 2015

(65) Prior Publication Data

US 2015/0381644 A1 Dec. 31, 2015

(30) Foreign Application Priority Data

Jun. 26, 2014 (KR) .................. 10-2014-0078732

(51) Int. Cl.
| | | |
|---|---|---|
| *G06F 11/00* | (2006.01) | |
| *H04L 29/06* | (2006.01) | |
| *G06F 11/07* | (2006.01) | |
| *G06F 21/56* | (2013.01) | |
| *H04W 4/00* | (2009.01) | |
| *G06F 9/445* | (2006.01) | |

(52) U.S. Cl.
CPC .......... *H04L 63/1425* (2013.01); *G06F 11/07* (2013.01); *G06F 21/563* (2013.01); *H04W 4/003* (2013.01); *G06F 8/61* (2013.01)

(58) Field of Classification Search
CPC .. H04L 63/1425; H04W 4/003; G06F 21/563; G06F 11/07; G06F 8/61
USPC .......................................................... 726/23
See application file for complete search history.

(56) References Cited

U.S. PATENT DOCUMENTS

| | | | |
|---|---|---|---|
| 8,935,794 B2 | 1/2015 | Brake et al. | |
| 9,424,427 B1 * | 8/2016 | Chiriac | ................. G06F 21/566 |
| 2005/0028002 A1 * | 2/2005 | Christodorescu | ..... G06F 21/562 |
| | | | 726/3 |
| 2013/0055238 A1 | 2/2013 | Lee et al. | |
| 2013/0312102 A1 | 11/2013 | Brake et al. | |
| 2014/0351941 A1 * | 11/2014 | Teller | ..................... G06F 21/56 |
| | | | 726/25 |
| 2015/0150131 A1 * | 5/2015 | Boutnaru | .............. G06F 21/567 |
| | | | 726/23 |

FOREIGN PATENT DOCUMENTS

| | | |
|---|---|---|
| KR | 20120084184 A | 7/2012 |
| KR | 20130022189 A | 3/2013 |

* cited by examiner

*Primary Examiner* — Mohammad W Reza

(57) ABSTRACT

A method for preventing a malicious code in an electronic device according to various embodiments of the present disclosure includes: converting a suspicious operation code to a logging operation code, executing the converted logging operation code, and displaying predictive operation information to a display unit related to the logging operation code according to the result of execution.

19 Claims, 7 Drawing Sheets

APPARATUS AND METHOD FOR PREVENTING MALICIOUS CODE IN ELECTRONIC DEVICE

CROSS-REFERENCE TO RELATED APPLICATION AND CLAIM OF PRIORITY

The present application is related to and claims benefit under 35 U.S.C. §119(a) to Korean Application Serial No. 10-2014-0078732, which was filed in the Korean Intellectual Property Office on Jun. 26, 2014, the entire content of which is hereby incorporated by reference.

TECHNICAL HELD

The present disclosure relates to a method for preventing a malicious code in an electronic device and an apparatus supporting the same.

BACKGROUND

According to developments in communication and interact, an electronic device can provide various functions such as a camera, messenger, voice and video communication, and social network service. The electronic device can download various applications or contents through an application market such as an appstore, A malicious code generating a harmful behavior can be included in the applications and contents, and information spill or illegal charging can be generated without consent of users, A trend in which applications include a malicious code is increasing, and thereby various methods for preventing damages due to the malicious code are required.

Generally, in order to detect a malicious code, a method for detecting a danger of an application is performed by comparing a pattern identified as a malicious code during installation of the application with a recorded database (DB); or a method for identifying whether a corresponding application is malicious is performed by monitoring a behavior of the installed application (for example, transmission and reception of a communication packet) and comparing the pattern of behavior with a DB that includes patterns of malicious behaviors.

However, such methods for detecting a malicious code do not account for a possibility that damages may have already occurred as a result being exposed to the malicious code before a user can identify a dangerous aspect of the corresponding application.

SUMMARY

To address the above-discussed deficiencies, it is a primary object is to provide a method for detecting a possibly dangerous aspect before execution or installation of the application and informing a user about the dangerous aspect in an electronic device enabling free installation and deletion of an application.

Another aspect of the present disclosure is to provide a method for detecting a malicious or suspicious network operation or for detecting a dangerous aspect in an operation accessing to a file system, and informing a user about the dangerous aspect by identifying a suspicious operation of application possibly generated due to execution or installation of an application.

In accordance with an aspect of the present disclosure, a method for preventing a malicious code in an electronic device is provided. The method includes: converting a suspicious operation code to a logging operation code, executing the converted logging operation code, and displaying predictive operation information to a display unit related to the logging operation code according to the result of execution.

In accordance with an aspect of the present disclosure, an apparatus for preventing a malicious code in an electronic device is provided. The apparatus includes: a communication unit configured to communicate with an external device; a display unit configured to display predictive operation information of the electronic device; and a control unit configured to convert a suspicious operation code to a logging operation code, to execute the converted logging operation code, and to control the display unit to display predictive operation information related to the logging operation code according to the result of execution.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

The terms and words used in the following description and claims are not limited to bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

In various embodiments of the present disclosure, an electronic device can be a smartphone or a tablet PC that is able to connect to a network through a wired or wireless communication and provide free installation or deletion of an application. The network includes an internet and a mobile communication network.

Figure 1:
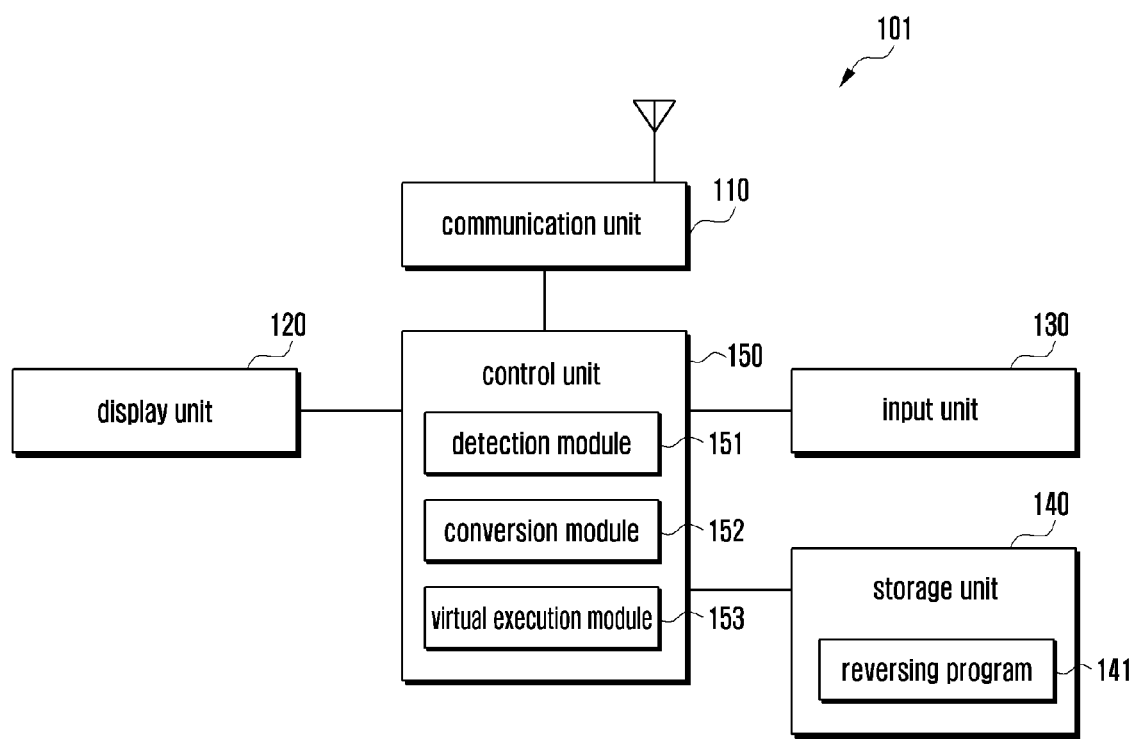
FIG. 1 is a schematic block diagram illustrating a configuration of electronic device according to various embodiments of the present disclosure.

FIG. 1 is a schematic block diagram illustrating a configuration of electronic device according to various embodiments of the present disclosure.

Referring to FIG. 1, the electronic device 101 includes a communication unit 110, display unit 120, input unit 130, storage unit 140, and control unit 150.

The communication unit 110 can perform a voice, video, or data communication with an external device, such as an electronic device and a server, by connecting to a network through a wired or wireless communication under the control of the control unit 150. The wireless communication includes at least one of a Wireless Fidelity (Wifi), BLUETOOTH® (BT), Near Field Communication (NFC), Global Positioning System (GPS), or a cellular communication such as an LTE, LTE-A, CDMA, WCDMA, UMTS, WiBro, and GSM. The wired communication includes at least one of a Universal Serial Bus (USB), High Definition Multimedia Interface (HDMI), Recommended Standard 232 (RS-232), and Plain Old Telephone Service (POTS).

The communication unit 110 receives data (hereafter, app data) from an external device. The app data includes an app installation file (for example, *.apk), app execution file, app related contents, and app related package file. For example, the app installation file, app execution file, and app related package file can be files formed in a binary machine language. The app related contents can be a file, data, or object prepared and distributed in a digital system such as text, audio, and video data.

If new app data is received, the communication unit 110 transmits the received app data to a server providing a malicious code diagnosis function and receives the result of malicious code diagnosis.

The input unit 130 generates signals for user setting and function control of a terminal and transmits them to the control unit 150. The control unit 150 controls functions related to corresponding signals by responding to such a signal. The input unit 130 includes a touch panel, pen sensor, and keys. The touch panel can identify a user's touch input with at least one type of electrostatic, pressure sensitive, infrared, or ultrasonic. The touch panel further includes a controller (not shown). In the meantime, in case of electrostatic type, proximity recognition can be utilized besides a direct touch. The pen sensor can be utilized by using a separate pen recognition sheet in the same method of receiving a user's touch input. The keys include mechanical keys or a touch keys.

The display unit 120 can perform a function of displaying a video or data for a user. The display unit 120 includes a display panel such as a Liquid-Crystal Display (LCD) or Active-Matrix Organic Light-Emitting Diode (AM-OLED). The display unit 120 further includes a controller for controlling the display panel. The display panel can be prepared in a flexible, transparent, or wearable form. In the meantime, the display unit 120 can be configured with one module by combining with the touch panel (for example; touch screen).

The storage unit 140 stores commands or data received from the control unit 150 or other elements (for example, display unit 120, input unit 130, and communication unit 110) or generated by the other elements. For example, the storage unit 140 can store an Operating System (OS) for booting the electronic device and operating the above elements, at least one application program, message for communicating with a network, and data for execution of the application program.

For example, the storage unit 140 includes a kernel, middleware, Application Programming Interface (API), or programming module for application. Each programming module can be configured with software, firmware, hardware, or their combinations.

The storage unit 140 includes a reversing program 141 (decompiler). The reversing program can be a program for restoring a binary file to an intermediate code in one-to-one correspondence with a machine language. For example, the intermediate code can be an internal code generated in the process of interpreting a source language program to an object code. The storage unit 140 includes data recorded with a suspicious operation code. Here, the suspicious operation code can be a code related to a log such as a network communication record, electronic device operation record (for example, history of storage usage). The operation code information related to a log can be information including a network connection code (for example, Urlconnection) and file system access code (for example, openfile).

The control unit 150 receives a command from the above elements (for example, communication unit 110, input unit 130, display unit 120, and storage unit 140), and can interpret the received command and perform arithmetic operation or data processing. If a power is supplied, the control unit 150 controls a booting procedure of the electronic device, and executes various application programs stored in a program area according to a user setting. The control unit 150 includes at least one Application Processor (AP) or at least one Communication Processor (CP).

In certain embodiments, the control unit 150 is configured with a detection module 151, conversion module 152, and virtual execution module 153. One or more of the detection module 151, conversion module 152, and virtual execution module 153 can be implemented by processing circuitry such as one or more processors, such as APs or CPs, configured to perform the functions of the detection module 151, conversion module 152, and virtual execution module 153.

The detection module 151 receives app data related to an application through a network by detecting a received (or downloaded) signal. The received app data can be stored in a designated area (location) of the electronic device. Hereafter, app data stored in a storage area and not processed by the electronic device is called original app data.

If app data is received, the detection module 151 identifies whether a malicious code diagnosis mode is activated. The electronic device can change an on/off state of the malicious code diagnosis mode according to a user setting. If the malicious code diagnosis mode is switched on, the detection module 151 transmits the received original app data to the conversion module 152.

If the app data is new one, the detection module 151 controls the communication unit to transmit the app data to a server providing a malicious code diagnosis function.

The conversion module 152 restores the original app data to a source code (for example, Java code) by performing a reverse engineering. The conversion module 152 converts a suspicious operation code included in the restored source code to a logging operation code. The suspicious operation code includes a suspicious code in a connection to a specific network (such as a URL connection, HTTP connection, and openfile), operation code for a network connection with an external device, operation code for accessing to a local file system (for example, private data), and operation code for accessing to a personal storage area. In certain embodiments, the logging operation code is an operation code for processing an operation of attempting to connect to a specific destination, or an operation of opening or accessing to a specific destination (for example, security storage).

In order to find out a suspicious operation code from the source code, the conversion module 152 compares with a database recorded with malicious patterns and identifies the suspicious operation code according to the result of comparison.

If a suspicious operation code exists, the conversion module 152 converts the corresponding suspicious operation code to a togging operation code. For example, the conversion module 152 can convert an operation code of "return stream handler openConnection(www.dada.com)" to a logging operation code of "logging ('tried to connect to 'www-.dada.com')".

Alternatively, if a suspicious operation code exists, the conversion module 152 converts a destination of network connection to an arbitrary destination (for example; from www.dada.com to www.dada.com').

The conversion module 152 changes an access path to a file system in a suspicious operation code (for example, from openfile/etc/password to openfile/etc/password') or converts to a logging operation code for accessing to the file system. For example, an operation code of "open file: private file/etc/passwor" can be converted to a logging operation code of "logging ('tried to open to 'open file: private file/etc/password')", The above logging command is only the example code for describing the present disclosure, and can be further changed in various ways according to the source code.

The conversion module 152 generates converted app data based on the converted operation code. The converted app data can be a package file compiled based on the converted operation code. For example, if the original app data is A.apk file, the converted app data can be A'.apk file.

The conversion module 152 transmits the generated app data to the virtual execution module 153.

The virtual execution module 153 temporarily processes the converted app data. The data processing can be installation or execution of application. By processing the converted app data, the virtual execution module 153 identifies a log corresponding to an operation or action generated in the electronic device while processing the app data. For example, when executing a converted app installation file in the electronic device, a log corresponding to an operation of connecting to a specific server, operation of recording a sound or video, operation of opening a local file can be predicted in a background.

The virtual execution module 153 controls the display unit to output predictive operation information corresponding to the logging operation code by analyzing the result of processing the converted app data. The predictive operation information can be operation information generated or predicted according to the suspicious operation code, such as an operation of attempting to connect to a destination A through a network and operation of attempting to access to a local file system. The virtual execution module 153 can control the display unit to guide an app installation together with the predictive operation information.

Each of the above elements in the electronic device can be configured with at least one component, and the name of element can differ according to the type of electronic device. The electronic device according to various embodiments of the present disclosure can be configured with at least one of the above elements, and some elements may be omitted or replaced with another element. Further, the electronic device according to various embodiments of the present disclosure can perform the same functions of corresponding elements by configuring with one entity combining some elements.

Figure 2:
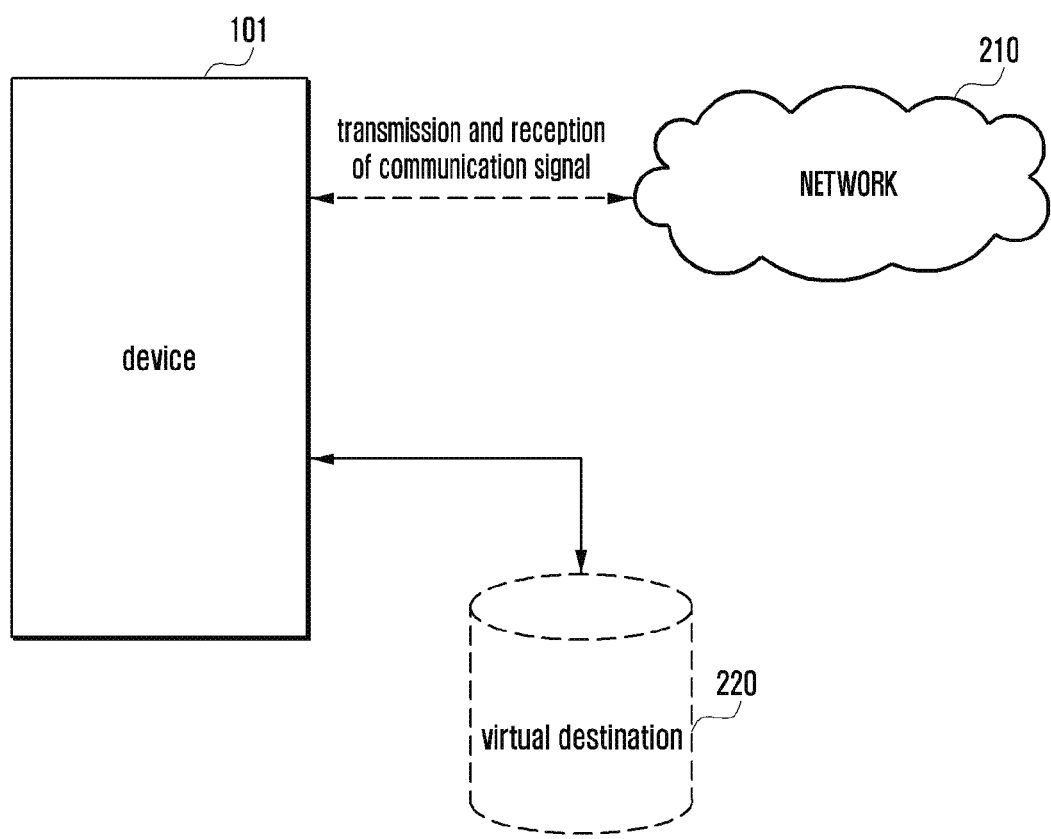
FIG. 2 is a conceptual diagram illustrating an operation scenario for preventing a malicious code in an electronic device according to various embodiments of the present disclosure.

FIG. 2 is a conceptual diagram illustrating an operation scenario for preventing a malicious code in an electronic device according to various embodiments of the present disclosure.

Referring to FIG. 2, if an operation code for connecting to destination A 210 (for example URL address) is included in an app installation file, the electronic device 101 automatically performs an operation of transmitting a request signal for connection to destination A 210 and an operation of receiving a response signal from the destination A 210 in a back ground regardless of user's intention.

In this case, a user cannot individually identify command execution information corresponding to a source code of app installation file. For example, if a malicious code is included in the response signal, the electronic device 101 can be exposed to the malicious code without any action.

According to various embodiments of the present disclosure, in order to prevent damages due to the spread of malicious code, the electronic device 101 converts a suspicious operation code (for example, access code to a network communication and personal data) included in an original app data to a logging operation code so that an operation practically generating a network communication can be bypassed.

The electronic device 101 re-compiles the converted operation code and temporarily processes the converted app data. By temporarily processing the converted app data, the electronic device 101 can practically secure a log corresponding to an operation or action generated during the app data processing.

For example, the electronic device 101 converts an operation code (for example, httpconnection: 'destination A') for connecting to destination A 210 to a logging operation code (for example, try to connection: 'destination A') or a logging operation code (httpconnection: destination A') attempting to connect to virtual, or an arbitrary, destination A' 220.

If so, the electronic device 101 may not perform a series of operations for connecting to a practical destination A 210 when processing the converted app data. The electronic device 101 can set only the destination for connection (an attempt to connect to destination A 210) and may not request for a practical connection by transmitting receiving a communication signal with the destination A 210.

Alternatively, if the electronic device 101 converts a destination for connection to an virtual destination A' 220, an operation of connecting to destination A 210 may not practically be performed even though the connection is requested, because the URL address has changed from destination A 210 to virtual destination A' 220.

Like this, when executing an app installation file before actual installation of application, a user can identify predictive operation information of attempting to access to destination A 210 or a local file system.

Figure 3:
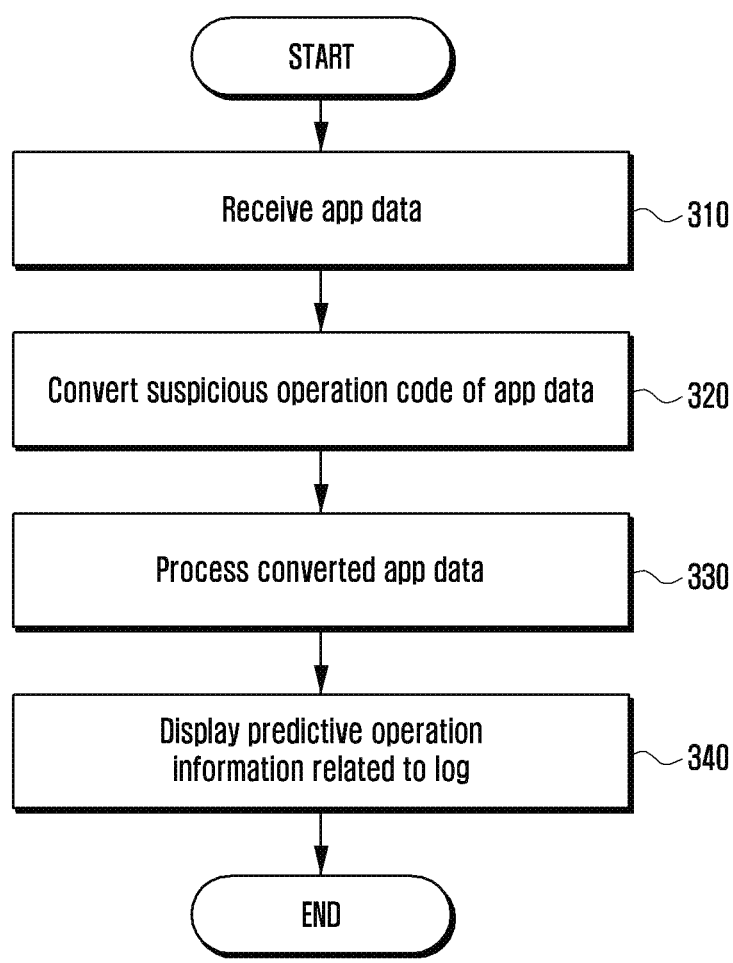
FIG. 3 is a flowchart illustrating a method for preventing a malicious code in an electronic device according to an embodiment of the present disclosure.

FIG. 3 is a flowchart illustrating a method for preventing a malicious code in an electronic device according to an embodiment of the present disclosure.

Referring to FIG. 3, the electronic device receives or downloads app data from an external electronic device such as a server or peripheral device at operation 310. Hereafter, it is assumed that app data is received from an external device. However, the present disclosure is not limited to this and can be implemented if a suspicious operation code is discovered during the process of driving the electronic device. For example, operation 310 can be omitted.

The electronic device generates converted app data by converting a suspicious operation code in app data to a logging operation code at operation 320.

For example, the electronic device can restore a source code by reverse-engineering an original app data, and convert a suspicious operation code in a source code such as an operation code related to a network operation and an operation code attempting to access to a local file system (for example, password storage area, resource directory, and security directory) to a logging operation code. The electronic device can generate converted app data by compiling the converted logging operation code. For example, in the reverse engineering of an app installation file (for example, *.apk), the electronic device can identify source codes (for example, Java script) of corresponding application as shown in Table 1.

TABLE 1

URL url= new URL("http://www.android.com/")
HTTpURLConnectionurlConnection - HTTpURLConncection)
url.OPENConnection( );
Try {
InputStream in-
new BufferedInputStream(urlConnection.getInputStrean( ));
readStream(in);
}Finally {
urlConnection.dissconnect( );
}

The electronic device identifies operation codes such as urlConnection and url.OPENConnection related to a log included in the source code of app installation file, and convert the operation code of original app data as listed in Tables 2 and 3.

TABLE 2

Public URLConnectionOpenConnection( ) ThorwsIOExecption{
Return StreamHandler.OpenConnection(This)
}

TABLE 3

Public URLConnectionOpenConnection( ) ThorwsIOExecption{
Logging("Tried to connect to"+ this)
Return null;
}

The electronic device converts an operation code of "return stream handler openConnection (www.dada.com)" to a logging operation code of "logging('tried to connect to 'www.dada.com')" and generates converted app data by re-compiling the converted logging operation code.

The electronic device processes the converted app data at operation 330. For example, the electronic device can process (execute or install) app data converted in a virtual space. The electronic device can process the converted app data and secure a log related to an operation or action generated in the electronic device according to the result of processing.

The electronic device displays predictive operation information related to the suspicious operation code in the display unit by analyzing the execution result of app data at operation 340. For example, the electronic device can configure a screen with predictive information of attempting to connect to a specific site, predictive information of attempting to access to a specific local file system, and risk level information of connecting to the specific site, and output the screen to the display unit.

Alternatively, the electronic device can compare an operation code related to a log with a database recorded with malicious patterns, and decide a risk level by identifying reliability of operation code related to the log according to the result of comparison.

Figure 4:
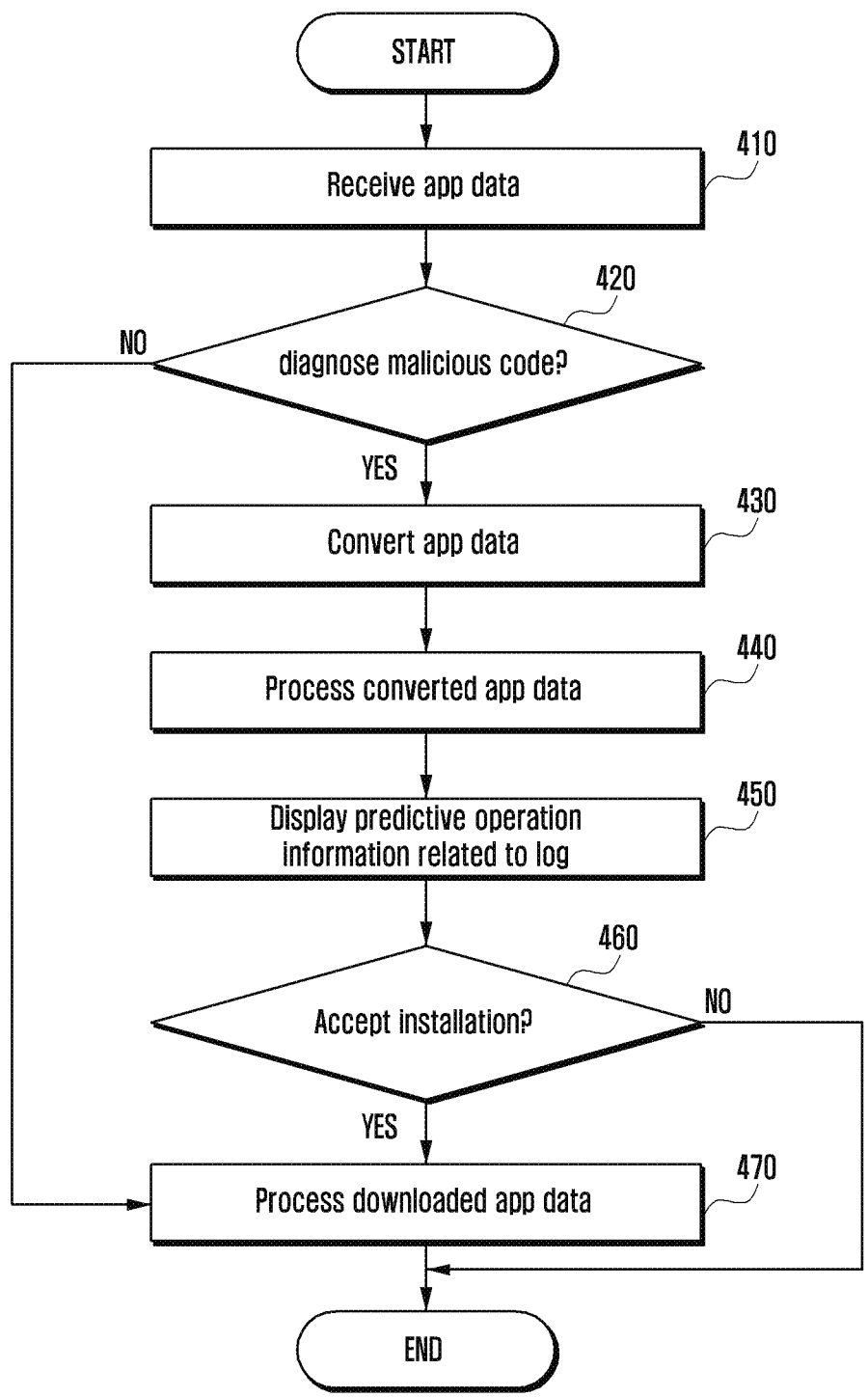
FIG. 4 is a flowchart illustrating a method for preventing a malicious code in an electronic device according to another embodiment of the present disclosure.

FIG. 4 is a flowchart illustrating a method for preventing a malicious code in an electronic device according to another embodiment of the present disclosure.

Referring to FIG. 4, the electronic device receives app data from an external electronic device at operation 410. Operation 410 can be omitted, and the electronic device can identify a suspicious operation code of app data in the process of driving the app data.

If new app data is received, the electronic device identifies whether a malicious code diagnosis function is enabled for the new app data at operation 420.

Alternatively, the electronic device can provide a function of setting a malicious code diagnosis mode. For example, if the malicious code diagnosis mode function is switched on, the electronic device can set according to a user setting so that all the app data are diagnosed for malicious codes according to the user setting, or execution of malicious code diagnosis can be asked to a user every time when the app data is received.

If the diagnosis of malicious code for the received app data is decided, the electronic device generates converted app data by converting the received app data at operation 430. For example, electronic device can convert the app data so that a suspicious operation code in the source code of received app data is bypassed, and generate the converted app data based on the converted operation code.

If a malicious code of the received app data is not to be diagnosed, the electronic device executes or processes the received app data at operation 470.

The electronic device temporarily processes the converted app data at operation 440. For example, the electronic device can process the converted app data in a virtual place. The electronic device processes the converted app data, and can identify a log corresponding to an operation or action generated in the electronic device according to the result of processing.

The electronic device displays predictive operation information related to a log in the display unit by analyzing the execution result of the converted app data at operation 450. For example, the electronic device can configure a screen with logging prediction information such as "Attempt to connect to a specific site" and "Attempt to access to a specific local file system" or with risk level information generated in the execution of specific operation code.

The electronic device informs a user that an operation or action suspected to be a malicious code has been generated by displaying the configured screen in the display unit. Together with the predictive operation information, the electronic device can provide guide information for asking whether to execute or install the received app data. For example, the electronic device can display logging prediction information or guide information for installation or execution in a popup window form in the display unit.

The electronic device identifies whether an input accepting to process an original app data (for example, approval input signal) is detected at operation 460. If an input accepting to process is detected, the electronic device processes the received original app data at operation 490. For example, the electronic device can install or execute an application by processing the app data, or process contents related to the application.

Alternatively, if the original app data has been processed, the electronic device can delete the converted app data according to a user's request or setup information.

If a user input refusing to process the app data (for example, refusal input signal) is detected, the electronic device terminates the process. According to various embodiments of the present disclosure, when not processing the original app data due to the possibility of malicious code, the electronic device can inform a user to delete the original app data. If the original app data is not processed, the electronic device can decide to delete or maintain the original app data according to a predetermined setup information.

Figure 5:
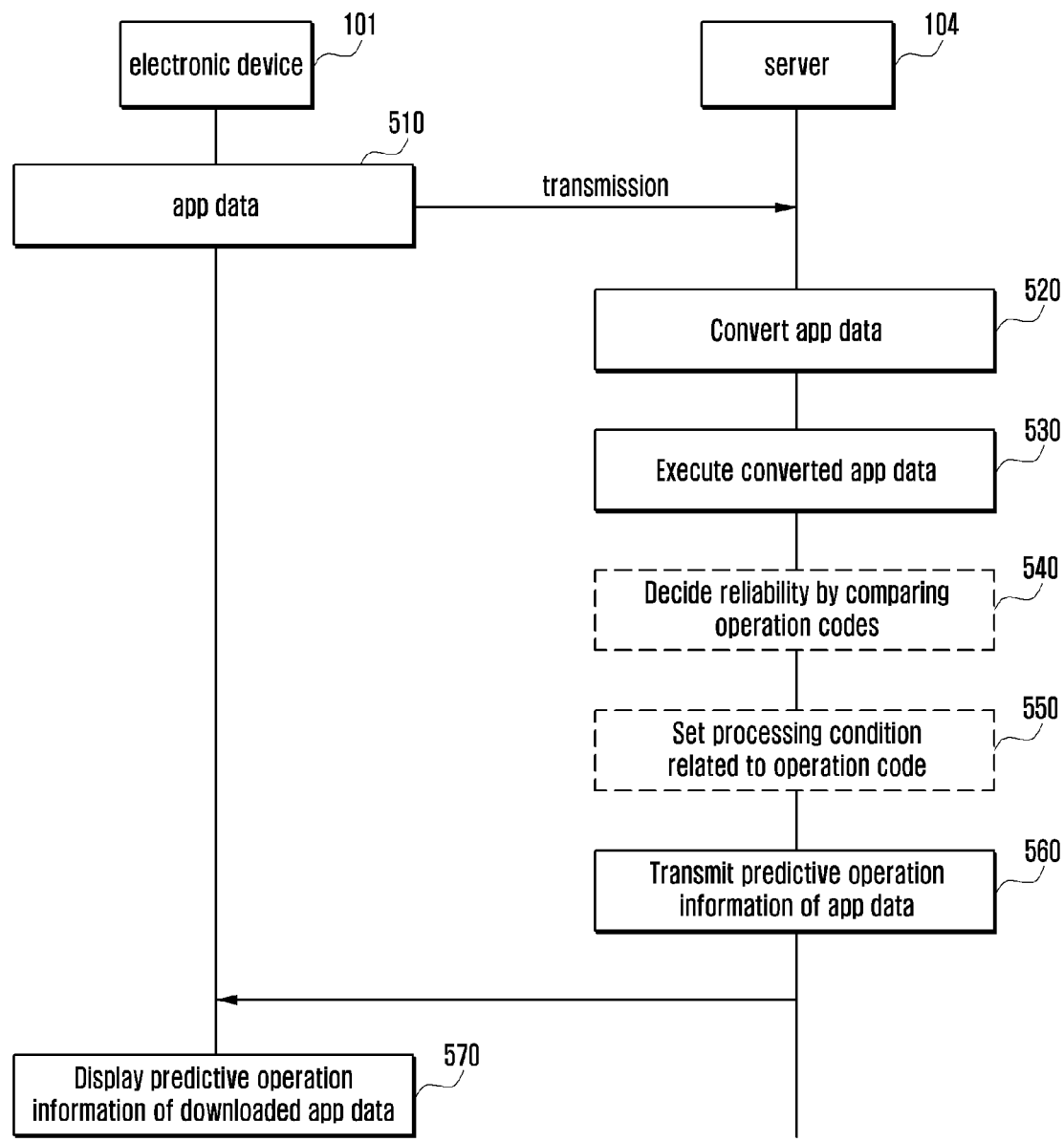
FIG. 5 is a flowchart illustrating a connection between an electronic device and a server for preventing a malicious code according to various embodiments of the present disclosure.

FIG. 5 is a flowchart illustrating a connection between an electronic device and a server for preventing a malicious code according to various embodiments of the present disclosure.

Referring to FIG. 5, a malicious code diagnosis function of the electronic device 101 can be synchronized with a server 104, The electronic device 101 transmits app data to the server 104 at operation 510.

The server 104 generates converted app data by converting app data received from the electronic device 101 at operation 520, For example, the server 104 can generate the app data by performing the same operation of the electronic device 101 shown as operation 30 of FIG. 3. The server 104 restores the app data received from the electronic device 101 to a source code, and covert a suspicious operation code in the source code to a logging operation code. The server 104 generates the converted app data based on the converted operation code.

The server 104 temporarily processes the converted app data at operation 530. By processing the converted app data, the server 104 secures a log related to an operation or action, and identifies predictive operation information.

For example, the server 104 can identify the possibility of malicious code and risk level by comparing with a database recorded with malicious patterns in order to decide the reliability of suspicious operation code. For this, the server 104 performs an operation of comparing the operation code related to a log with a code pattern DB (data base) at operation 540. The server 104 records or store suspicious operation codes identified as a malicious pattern in a history.

The server 104 identifies the reliability of corresponding code by comparing the operation code of app data received from the electronic device 101 with the code pattern database. Here, the reliability can be expressed with a ratio (%) or numerical value. When an operation code is executed in the electronic device 101, the reliability can be used for identifying whether the operation code is recorded in the history of malicious action (for example, information spill, DOS action, recording a sound or video, and illegal charging action), whether the operation code has a history classified as a malicious code, whether the source of operation code is an official source, or whether the operation code has an access right to a stored location. For example, if a destination of network connection is an official source, the reliability of operation code for a network connection is relatively high. However, if the destination of network connection is a doubtful source, the reliability of operation code for network connection becomes relatively low. The server 104 can identify the reliability of operation codes by comparing the operation codes and provide risk level information for the electronic device 101 based on the reliability.

The server 104 sets a process condition of app data having a low reliability or suspected to include a malicious code at operation 550. For example, the server 104 can set so that predictive operation information and risk level information of original app data are informed to a user or processing of the app data is prohibited.

Alternatively, the server 104 may omit the operations 540 and 550.

The server 104 transmits logging prediction information and risk level information of app data to the electronic device 101 at operation 560. The electronic device 101 informs the logging prediction information and risk level information received from the server 104 to a user by displaying in the display unit. For example, when the logging prediction information and risk level information are received from the server 104, the electronic device 101 can guide the user by performing the operations 450 to 470 of FIG. 4, and decide the process of app data according to a user's selection.

Figure 6:
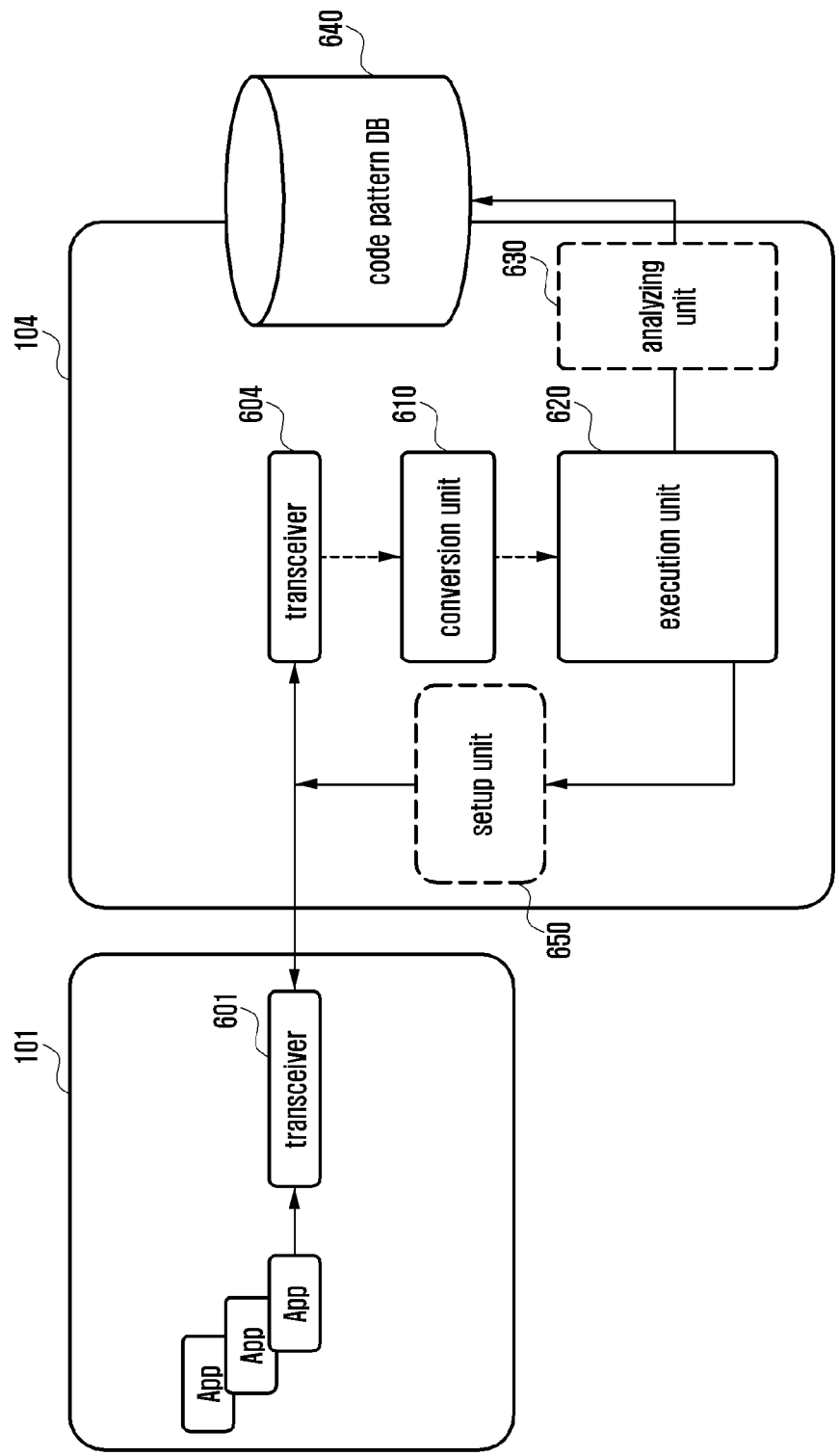
FIG. 6 is a block diagram illustrating a connection between an electronic device and a server according to various embodiments of the present disclosure.

FIG. 6 is a block diagram illustrating a connection between an electronic device and a server according to various embodiments of the present disclosure.

Referring to FIG. 6, the electronic device 101 transmits app data such as an, app file and app related contents to the server 104 through a transceiver 601, and server 104 receives the app data through the transceiver 604.

The server 104 transmits the app data received through the transceiver 604 to a conversion unit 610. The conversion unit 610 restores the app data received from the electronic device 101 and converts a suspicious operation code in the restored source code to a logging operation code.

The conversion unit 610 generates converted app data based on the logging operation code. The converted app data may be package file compiled based on the converted operation code. The conversion unit 610 can transmit the converted app data to an execution unit 620.

The execution unit 620 processes the converted app data and identifies a log corresponding to an operation or action generated during the processing of app data in the electronic device. The execution unit 620 configures predictive operation information related to the log y analyzing the result of processing the converted app data.

According to various embodiments of the present disclosure, the server 104 transmits information of operation cods to an analyzing unit 630 in order to decide the reliability of operation codes related to the log. The analyzing unit 630 decides the reliability of corresponding codes by comparing the operation codes of app data with a code pattern database 640. For example, if the operation code is for connecting to a national certification site, the analyzing unit 630 identifies the reliability of operation code as a risk 0%, If the operation code is for connecting to a local system storing passwords, the analyzing unit 630 identifies the reliability of corresponding code as a risk 90%.

The analyzing unit 630 transmits the log and reliability of related operation codes to a setup unit 650. The setup unit 650 sets a processing condition of operation code to be executed in the electronic device by identifying the log and reliability of related operation codes. For example, the setup unit 650 can set the processing condition not to process the corresponding operation code if the operation code is for connecting to a local system storing passwords, because the reliability is a risk 90%.

The server 104 transmits the logging prediction information and risk level information of app data to the electronic device according to the result of malicious code diagnosis for the app data.

Figure 7:
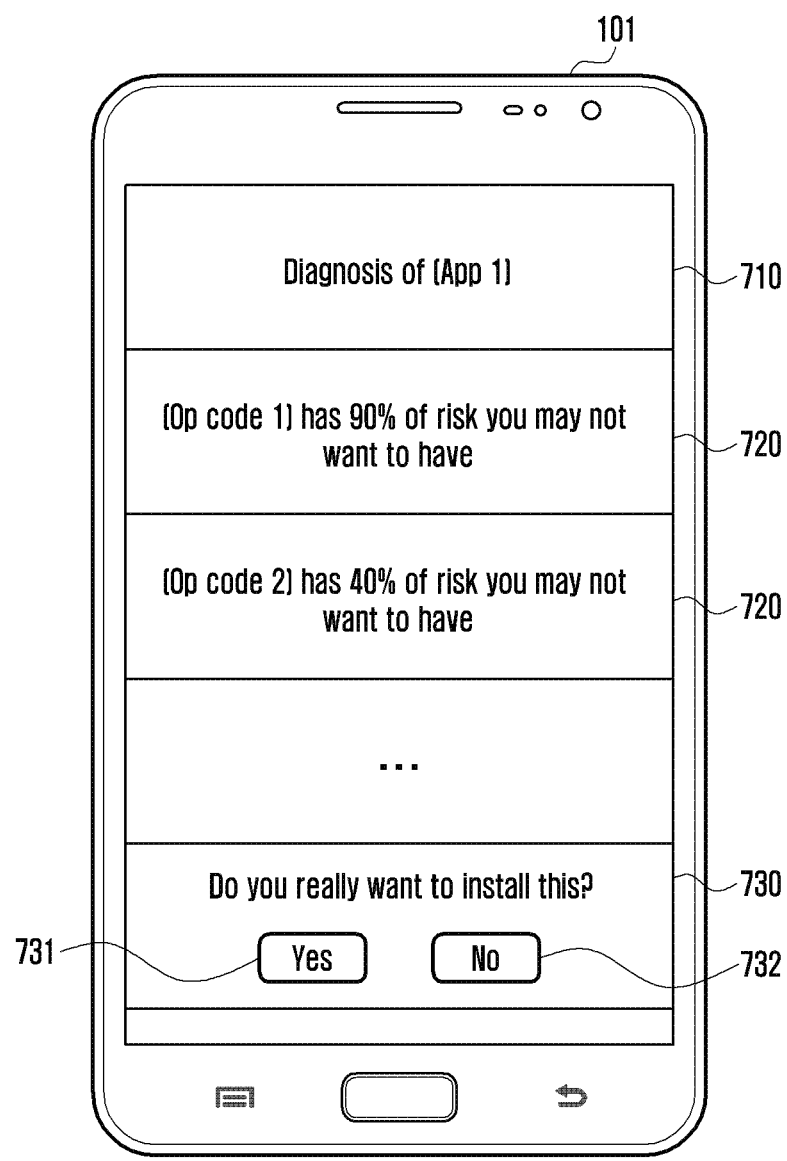
FIG. 7 is a screen example illustrating a user interface for providing malicious code information according to various embodiments of the present disclosure.

FIG. 7 is a screen example illustrating a user interface for providing malicious code information according to various embodiments of the present disclosure.

Referring to FIG. 7, the electronic device 101 displays a malicious code diagnosis screen 710 of app data in the display unit before processing the app data. For example, the malicious code diagnosis screen 710 can include suspicious operation code information (for example, OP code 1 and OP code 2). Even though OP code 1 and OP code 2 are shown as suspicious operation code information in FIG. 7, the suspicious operation code information may be shown like "Operation code attempting to access to a specific web site" for user convenience. The electronic device 101 can provide suspicious operation code in a list form.

The electronic device 101 provides a guide message 730 in the malicious code diagnosis screen 710 in order to ask whether to process the app data or not. The guide message 730 includes information for confirming the process of app data, process approval item 731 and refusal item 732. The user can identify predictive operation information according to the suspicious operation code and decide whether to process the received app data or not.

The electronic device 101 provides risk level information (for example, risk 90%) based on the reliability of operation code together with operation code information related to a log.

In the apparatus (for example, modules or their functions) and method (for example, operations) according to various embodiments of the present disclosure, at least one portion can be implemented with a command stored in computer-readable storage media which can be read in a programming module form. When the command is executed by more than one control unit, the control units can perform a function corresponding to the command. The computer-readable storage media can be used as the storage unit. At least a portion of the programming modules can be implemented by the control unit. At least a portion of the programming modules may include a module, program, routine, sets of instructions, and processes in order to perform at least one function.

According to various embodiments of the present disclosure, when at least one commands stored in the storage media is executed by at least one control unit, the at least one command can be set to perform at least one function. In the method for preventing a malicious code, the at least one function includes operations for: converting a suspicious operation code to a logging operation code, executing the converted logging operation code, and displaying predictive operation information to a display unit related to the logging operation code according to the result of execution.

The present disclosure can effectively cope with malicious codes issued in portable terminals which are used increasingly, such as a smartphone and tablet PC. Differently from the prior art, the algorithm of the present disclosure can convert a portion of applications possibly having a malicious code, such as an operation code related to a network connection and an operation code accessing to a file system, to a logging operation code, and thereby can identify a dangerous factor in an application by testing converted app data.

The present disclosure can detect a network operation and a file system accessing operation before or during installation or execution of applications, and thereby can guide a user so that a suspicious malicious code is not installed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for preventing a malicious code in an electronic device, the method comprising:
   selecting, by a control unit, at least one suspicious operation code among a plurality of operation code;
   converting, by the control unit, the selected at least one suspicious operation code to a logging operation code;
   executing, by the control unit, the converted logging operation code; and
   displaying, by the control unit, predictive operation information related to the logging operation code according to a result of the execution on a display unit of the electronic device,
   wherein the at least one suspicious operation code comprises at least one operation code for accessing to a specific network, operation code for a network connection with an external device, operation code for accessing to a local file system or private data, and operation code for accessing to a personal storage area.

2. The method of claim 1, wherein the executing, by the control unit, the converted logging operation code comprises:
   generating app data by compiling the converted logging operation code; and
   identifying the predictive operation information by executing the generated app data.

3. The method of claim 2, wherein the suspicious operation code is an operation code related to the generated app data, and the displaying comprises:
   identifying reliabilities of operation codes by comparing the operation codes of the generated app data with a database recorded with malicious patterns of operation codes, deciding a risk level of operation code according to the reliability; and outputting the decided risk level and the predictive operation information.

4. The method of claim 3, wherein the deciding the risk level of operation code comprises:
setting a process condition of the generated app data corresponding to the at least one suspicious operation code based on a decision of reliability.

5. The method of claim 1, wherein the displaying the predictive operation information comprises outputting a guide message for confirming installation of received app data together with the predictive operation information.

6. The method of claim 1, wherein the logging operation code is at least one operation for: attempting to connect a specific destination to a network, attempting to open a local file system, or attempting to access to security storage data.

7. The method of claim 1, wherein the displaying the predictive operation information comprises outputting reliabilities of the at least one suspicious operation codes and risk level information corresponding to the predictive operation information.

8. An apparatus capable of preventing a malicious code in an electronic device, the apparatus comprising:
a communication unit configured to communicate with an external device;
a display unit configured to display predictive operation information of the electronic device; and
a control unit configured to:
select at least one suspicious operation code among a plurality of operation code,
convert the selected at least one suspicious operation code to a logging operation code, to execute the converted logging operation code, and
control the display unit to display predictive operation information related to the logging operation code according to a result of the execution,
wherein the at least one suspicious operation code comprises at least one operation code for accessing to a specific network, operation code for a network connection with an external device, operation code for accessing to a local file system or private data, and operation code for accessing to a personal storage area.

9. The apparatus of claim 8, wherein the control unit is configured to generate app data by compiling the converted logging operation code and identify the predictive operation information by executing the generated app data.

10. The apparatus of claim 9, wherein the control unit comprises a virtual execution module configured to execute the generated app data and to compose a screen based on the predictive operation information.

11. The apparatus of claim 9, wherein the communication unit is configured to receive a process condition of the generated app data from a server.

12. The apparatus of claim 11, wherein the control unit is configured to process the generated app data based on the received process condition of the generated app data.

13. The apparatus of claim 8, wherein the control unit is configured to control the display unit to display a guide message for confirming installation of received app data together with the predictive operation information.

14. The apparatus of claim 8, wherein the control unit is configured to control the display unit to display reliabilities of the at least one suspicious operation code and risk level information corresponding to the predictive operation information.

15. The apparatus of claim 12, wherein the control unit is configured to identify reliabilities of operation codes by comparing the operation codes of the generated app data with a database recorded with malicious patterns of operation codes, and decide a risk level of operation code according to the reliability.

16. The apparatus of claim 14, wherein the control unit is configured to receive the reliabilities of the at least one suspicious operation code and the risk level information from a server.

17. A non-transitory computer readable medium comprising a plurality of instructions configured to, when executed by a processor, cause the processor to:
select at least one suspicious operation code among a plurality of operation codes;
convert the selected at least one suspicious operation code to a logging operation code, to execute the converted logging operation code; and
control a display unit to display predictive operation information related to the logging operation code according to a result of the execution,
wherein the at least one suspicious operation code comprises at least one operation code for accessing to a specific network, operation coded for a network connection with an external device, operation code for accessing to a local file system or private data, and operation code for accessing to a personal storage area.

18. The non-transitory computer readable medium of claim 17, wherein plurality of instructions is configured to, when executed by a processor, cause the processor to generate app data by compiling the converted logging operation code and identify the predictive operation information by executing the generated app data.

19. The non-transitory computer readable medium of claim 17, wherein plurality of instructions is configured to, when executed by a processor, cause the processor to at least one of:
control the display unit to display a guide message for confirming installation of received app data together with the predictive operation information;
control the display unit to display reliabilities of the at least one suspicious operation code and risk level information corresponding to the predictive operation information;
identify reliabilities of operation codes by comparing the operation codes of the received app data with a database recorded with malicious patterns of operation codes, and decide a risk level of operation code according to the reliability; or
receive the reliabilities of the at least one suspicious operation code and the risk level information from a server.

* * * * *